United States Patent
Bremnes et al.

(10) Patent No.: US 7,381,900 B2
(45) Date of Patent: Jun. 3, 2008

(54) POWER CABLE FOR DIRECT ELECTRIC HEATING SYSTEM

(75) Inventors: Jarle Jansen Bremnes, Fredrikstad (NO); Ole Kristen Nygard, Gamle Fredrikstad (NO)

(73) Assignee: NEXANS (FR)

( * ) Notice: Subject to any disclaimer, the term of this patent is extended or adjusted under 35 U.S.C. 154(b) by 0 days.

(21) Appl. No.: 11/728,959

(22) Filed: Mar. 26, 2007

(65) Prior Publication Data

US 2007/0240893 A1 Oct. 18, 2007

(30) Foreign Application Priority Data

Apr. 10, 2006 (NO) .................................. 20061613

(51) Int. Cl.
*H01B 7/18* (2006.01)
(52) U.S. Cl. ..................... 174/102 R; 174/78
(58) Field of Classification Search ........... 174/102 R, 174/105 R, 78, 120 SC; 166/248; 392/301
See application file for complete search history.

(56) References Cited

U.S. PATENT DOCUMENTS

2007/0044992 A1 3/2007 Bremnes ..................... 174/102

FOREIGN PATENT DOCUMENTS

GB 2352082 1/2001

OTHER PUBLICATIONS

Search Report—Jul. 13, 2007.
Norwegian Search Report—Nov. 8, 2006.

*Primary Examiner*—Chau N. Nguyen
(74) *Attorney, Agent, or Firm*—Sofer & Haroun, LLP

(57) ABSTRACT

Electric power cable used as a riser (15) and/or feeder cable (16) in a Direct Electric Heating system for oil or condensate pipelines (10), comprising at least two conductors (1, 5) and insulation layers (3, 6). An outer concentric conductor (5) is connected to a near end of the pipeline, and a central conductor (1) is connected via a piggyback cable (12) to a far end of the pipeline, to provide power for the heating. Another aspect is a terminal assembly adapted to providing an electric connection of the electric power cable with the pipeline (10), where a cone (41) is adapted to squeeze the concentric conductor (5) against a concentric conductor adapter (40).

19 Claims, 3 Drawing Sheets

POWER CABLE FOR DIRECT ELECTRIC HEATING SYSTEM

RELATED APPLICATION

The present invention is related to and claims the benefit of priority from Norwegian Patent Application No. 2006 1613, filed on Apr. 10, 2006, the entirety of which is incorporated herein by reference.

BACKGROUND OF THE INVENTION

1. Field of the Invention

The present invention generally relates to the field of subsea electric power cables. More specifically, it relates to a coaxial dynamic riser and feeder cable for direct electric heating (DEH) of an oil or condensate pipeline and a termination of the coaxial feeder cable to the pipeline.

2. Description of the Related Art

The temperature of the oil or condensate in the underground reservoirs is typically about 90° C. The oil or condensate well stream contains several liquid substances that freeze when the temperature drops. This is a problem when the pipes are cooled in seawater, particularly during a shutdown of production, which causes the flow in the line to be impeded or even blocked due to the formation of hydrates or wax plugs. To solve this problem chemical treatments are mainly used. However, this method has considerable operational costs and presents a risk to the environment should a leakage occur.

As an alternative to chemical treatment, electric heating has been suggested. Three methods may be used: i) electric heating cables, ii) electromagnetic induction heating, or iii) direct electric heating of the pipeline. The first alternative is found to be rather inefficient, and the second very expensive.

The direct heating system is based on the fact that an electric current in a metal conductor generates heat due to ohmic loss. The power supply is then connected directly to the electrically insulated steel pipe.

For heating of oil or gas pipelines in order to prevent hydrate and ice formation on the pipeline walls, the present applicant has developed a direct electrical heating system that is described, inter alia, in British patent specification No. 2.373.321. For current supply to such a heating system a common practice is to install a current supply cable as a so called "piggyback" cable, which is traditionally made simultaneously with the laying of the pipeline. More specifically such a single-core cable is strapped to the pipeline during installation thereof. The return current should of course as a whole flow through the pipeline walls in order to generate the heating effect aimed at.

GB 2 341 442 A describes an example of a heating system which can be used for pipelines on the sea floor. In this system, the metallic tube of the pipeline is electrically and thermally insulated and connected to a power supply which feeds a current through the metallic tube, whereby an efficient heating is achieved with alternating current.

For the energy supply of electric devices on the seafloor subsea cables are known which contain one or several conductors with high voltage insulation, outer sheath(s), and possibly metallic armoring. The (possibly dynamic) cable connecting the topside energy supply to the (static) subsea cables may comprise a number of power cores. Only single core static cables are know to have been used in earlier direct electric heating projects.

The cable may be squeezed during installation between the pipeline and hard objects. As the pipeline expands and contracts during operation, the cable is generally subject to stretching and sliding forces against the seabed. These problems are aggravated, if the pipeline spans valleys between reefs or boulders on the seabed.

A sufficient protection can be achieved with a steel armoring if the cable carries both the feeding and the return current. The direct electric heating system, however, requires only a single conductor because the metallic tube of the pipeline is used as conductor. In this case, an alternating current causes excessive electric losses if a metal armoring is applied to the cable.

Any feasible Direct Electric Heating system will require a large current, and thus also a considerable conductor cross-section area (typically>400 mm$^2$). It is difficult to achieve good dynamic properties with a cross section that comprises two (large) conductors, as bending properties become very dependent on the bending plane. For improving the properties in this respect, it would be possible to design and use a three-core dynamic cable, and consider one core as spare, but this solution results in dimensions, weight and cost being far from optimized.

The coaxial power cable according to the first aspect of the invention solves the dynamic problems by providing a two-conductor, high voltage, submarine cable design suitable for dynamic applications. This two-core cable is primarily intended for connection to topside supply for (single-phase) DEH (Direct Electric Heating) systems.

This coaxial cable also meets a common additional requirement regarding inclusion of non-electric elements, e.g. steel tubes or fiber optic cables, within the dynamic cable cross section. Such integration must take into consideration electromagnetic induction from the two power cores.

Electric connection between a dynamic cable and the piggyback cable and the pipeline's near end, respectively, is known to have been accomplished by means of a pair of individually armored single-core feeder cables. Replacing the single-core cables by a single, armored coaxial feeder cable eliminates the added risk of AC corrosion due to induced, circulating amour currents.

Another aspect of the present invention is related to termination of the above coaxial or concentric cables. Technical problems solved by the invention are to prevent corrosion of the outer threads and to secure enough mechanical contact between the conductor and termination head.

According to the invention, the terminal assembly comprising a concentric conductor adapter, is adapted to providing an electric connection of the electric power cable with a pipeline, where at least one cone (conically shaped metallic ring) is adapted to squeeze the concentric conductor of the electric power cable against an electric conductive part of the of the concentric conductor adapter.

A press-plate may be used to press the cone inwards and a number of threaded bolts may be used to press the plate against the cone. Electric contact between the concentric conductor and the pipeline is achieved via a concentric conductor adapter and a concentric conductor connection point.

The cone and the press plate may be made of different types of materials including steel. In some embodiments non magnetic material may be used to avoid excessive power loss due to electric currents.

To summarize, the electric power cable according to one aspect of the invention has the excellent dynamic and electromagnetic properties required to solve central problems related to such cables. The terminal assembly according to another aspect of the invention, is, compared to prior art solutions, easy to make corrosion resistant, relatively fast and easy to mount at site and cost effective.

BRIEF SUMMARY OF THE INVENTION

The present invention generally relates to the field of subsea electric high voltage power cables. More specifically, it relates to a coaxial dynamic riser and feeder cable for direct electric heating with a connection of the coaxial feeder cable to the oil or condensate pipeline.

The invention applies a coaxial design to achieve excellent dynamic properties, as well as excellent electro-magnetic properties for said cable.

The first aspect of the invention relates to an electric power cable used as a riser and/or feeder cable in a Direct Electric Heating system for oil or condensate pipelines, comprising at least two conductors, insulation layers, armoring means and an outer protective sheath. The electric power cable is characterized in comprising an outer concentric conductor connected to a near end of the pipeline, and a central conductor connected via a piggyback cable to a far end of the pipeline, to provide power for the heating of said pipeline, and a first insulation layer located between the central and the concentric conductors and a second insulation layer located outside the concentric conductor.

Another aspect of the invention relates to a terminal assembly for establishing an electric connection between a concentric conductor in an electric power cable and a concentric conductor adaptor. The terminal assembly is squeezing the conductor threads of the concentric conductor of the electric power cable against an electrically conductive part of the main housing of the concentric conductor adapter by the use of at least one cone.

BRIEF DESCRIPTION OF THE DRAWINGS

The invention and its advantages may be more easily understood by reference to the following detailed description and attached drawings, in which.

DETAILED DESCRIPTION OF THE INVENTION

Figure 1:
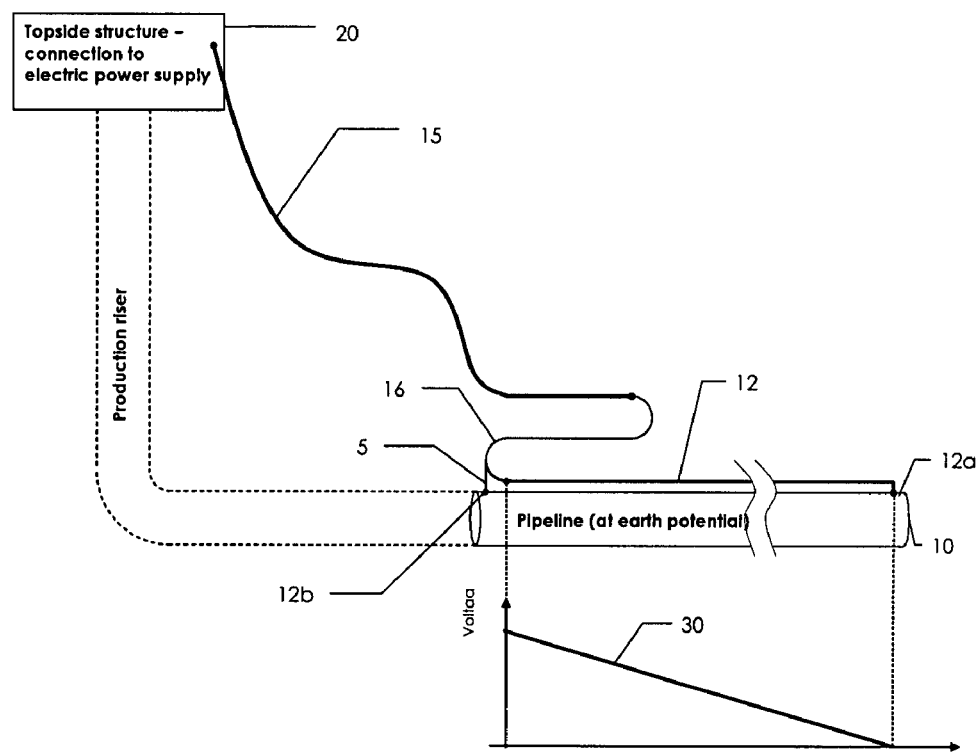
FIG. 1 schematically shows a system overview of a Direct Electric Heating system comprising a coaxial riser and feeder cable.

FIG. 1 illustrates a pipeline 10 with a direct electric heating system comprising an electric power cable and a terminal assembly according to the present invention.

An electric power supply unit arranged on a topside structure 20 comprised by the total plant or platform concerned. From the power supply unit there is a two-conductor supply cable or riser cable 15 extended down to the subsea installation concerned, where there is provided an armored feeder cable 16. The lower end of cable 16 is at one side connected to the near end 12b of the piggyback cable 12, and on the other side (the other conductor) is connected as shown at 12a to the far end of pipeline 10.

The pipeline 10 has an outer thermal insulation ensuring that crude oil or condensate coming from the well template has a sufficiently low viscosity until it reaches the platform 20. If the pipeline flow is stopped, formation of hydrate plugs and wax deposits occur which can block the pipeline when fluid transportation is to be resumed.

To avoid this problem the pipeline 10 can be heated. One or several sections of the pipeline 10 are connected to the power supply unit installed on the platform 20 with riser cable 15 mentioned above containing one or more conductor pairs. The riser cable 15 is usually protected by armoring and an outer sheathing.

The conductor of the piggyback cable 12 is connected to the far end of the pipeline 10. At 12a there is shown an electric connection point between the piggyback cable 12 and the pipeline 10, for current supply to the latter at this far end.

In FIG. 1 below the pipeline 10, there is a diagram showing a curve 30 representing the piggyback cable voltage with respect to "electric earth", i.e. the surrounding armoring and sea water. Thus, at the far end 12a of the piggyback cable 12 and the pipeline 10, the curve 30 goes down to zero.

The direct electric heating system layout demands that one of the two conductors; namely the concentric conductor 5 (see FIG. 2) is connected to the near end 12b of the pipeline 10 to be heated. Consequently, the concentric conductor 5 (in FIG. 2) is earthed at this location. The topside end of the concentric conductor 5 will have a voltage to earth equal to the longitudinal voltage drop along this conductor. For typical cable lengths this voltage will be well below 0.6 kV (voltage to earth/amour). For typical lengths the concentric conductor 5 may thus be regarded as a low voltage conductor, and does not require high voltage insulation. For lengths exceeding this, causing a voltage less than 1.8 kV (to earth/amour), it is straightforward to increase the insulation level by increasing the sheath thickness. In case of even higher voltage levels it may be a requirement to add semi-conducting screens underneath and over the insulating sheath, as is a common requirement in international cable standards. The concentric conductor 5 will be fully capable of meeting these insulation requirements.

The other conductor; namely the central conductor 1, however, is connected to the piggyback cable 12, which runs along the full pipeline 10 length, and is connected to the far end of the pipeline 12a. A complete (standard) high voltage core is required for, and it is straightforward to place this core at the center of the coaxial design.

Figure 2:
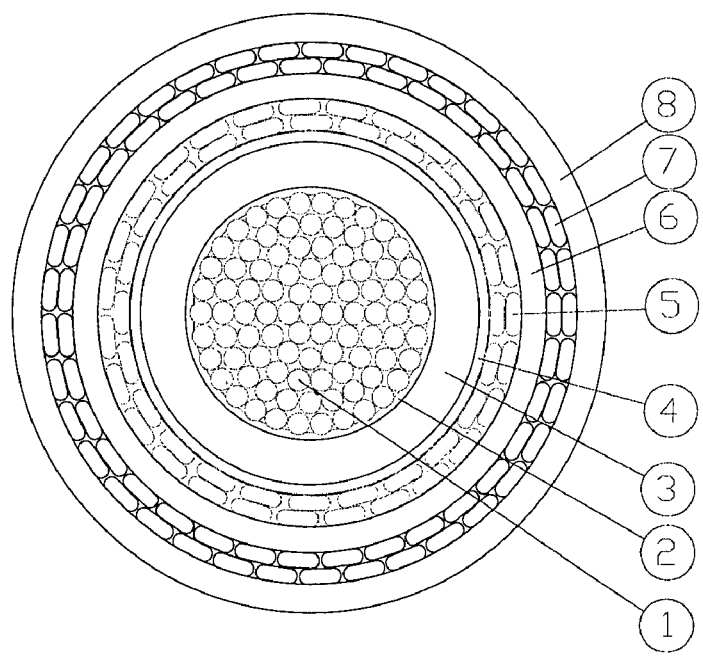
FIG. 2 presents a cross-sectional view of a power cable according to the present invention.
Figure 2A:
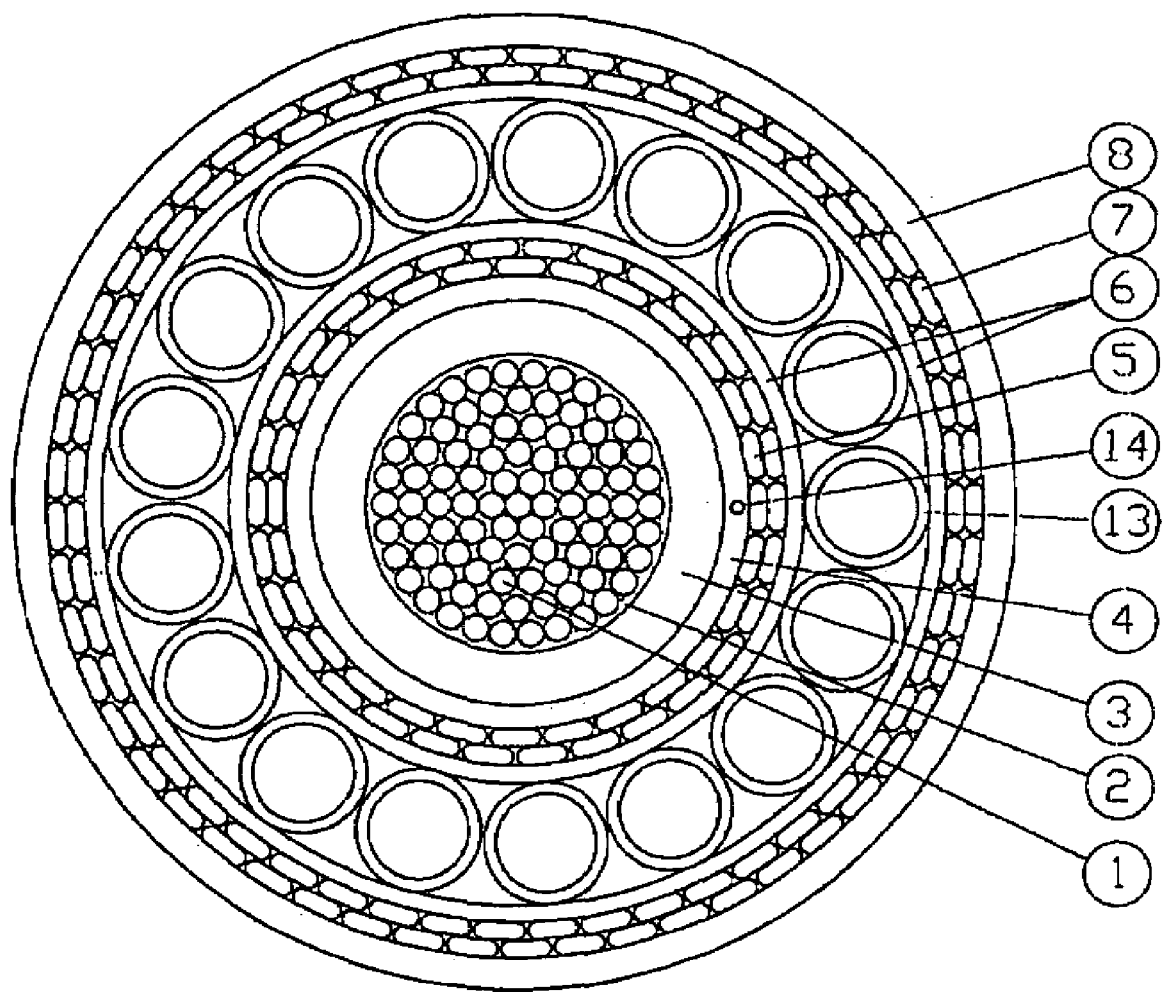
FIG. 2A presents a cross-sectional view of a power cable according to another embodiment of the present invention.

The coaxial dynamic cable can be designed with a conventional, high voltage power core (normally above +3.6kV) at the centre illustrated as the central conductor 1 in FIG. 2, while the second power core is provided in the form of the concentric conductor 5. In a preferred embodiment the concentric conductor comprises at least one layer of stranded, flat copper wires with a width exceeding twice the height of the wire. As stated above, this concentric conductor 5 typically does not need high voltage insulation-even in case of very long supply cables an extruded, insulating sheath 6 dimensioned with adequate thickness will suffice as insulation to earth/armour. In case of extreme lengths it may be necessary to add semi-conducting layers on both sides of the insulating sheath, based on relevant international standards. As shown in FIG. 2A, additional electric and/or other types of elements, such as fibre optic signal cables or steel tubes (13), are located in between the concentric conductor (5) and the armouring layer (7).

One basic property of such a coaxial cable is that the magnetic field originating from the current flowing in the conductors is zero outside the concentric conductor 5, provided that there is no metallic connection between concentric conductor and armour. Consequently, elements (not shown in the figures) placed in-between the concentric conductor 5 and the armour 7 will experience zero electromagnetic, induction from the conductor currents. This also applies for the steel armouring 7, which is generally needed to achieve required strength and robustness. Armouring may also be provided by integral tensile strength wire-elements in the conductors. No electromagnetic induction in armour and/or other metallic elements implies minimum achievable power loss (conductor Joule losses only-no stray losses). Fibre optic elements (14) for piggyback fault detection shown in FIG. 2A, may be located inside a semi-conducting sheath between the two conductors (1, 5).

Another benefit for large conductors is that the current distribution across the conductor cross section is far smoother, implying reduced power loss for a given conductor size. The thermal properties must be investigated on a case-to-case basis, but usually the coaxial design will require less copper than a two-core design with common armoring.

The central conductor 1 typically consists of stranded copper wires. To prevent longitudinal water penetration and facilitate repair, gaps in the central conductor 1 are filled with a hydrophobic water-blocking compound.

The central conductor 1 is surrounded by an inner screen 2 of semi-conductive cross-linked compound, a first insulation layer 3 of cross-linked polyethylene and an outer screen 4 consisting of semi-conductive cross-linked compound.

The insulation layers 3, 6 are dimensioned to provide sufficient insulation based on several factors including voltage and current levels and pipeline length.

The cross-section of the armoring elements 7 may be circular or flat. The armoring elements 7 give high strength to the subsea cable so that it can be installed in great depths. A protective sheath 8 is extruded over the armoring.

The layer structure of the coaxial cable as illustrated in FIG. 2 is summarized below.

Central conductor 1
Conductor screen layer 2 consisting of a semi-conductive, cross-linked compound.
Main insulation layer 3, usually in the form of a cross-linked polyethylene material.
Insulation screen 4 of a semi-conductive, cross-linked compound.
Concentric conductor 5
Inner insulating sheath 6 of polyethylene.
Amour layer 7.
Outer protective sheath 8 also of an insulating polyethylene.

Figure 3B:
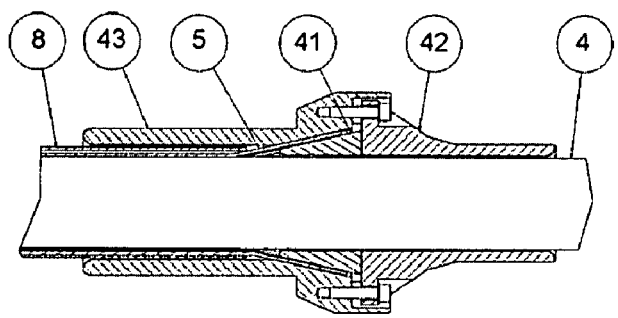
FIG. 3B presents an axial sectional view of the concentric conductor adapter.
Figure 3C:
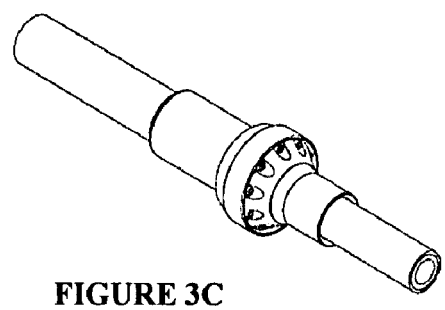
FIG. 3C presents a perspective view of the concentric conductor adapter.
Figure 3A:
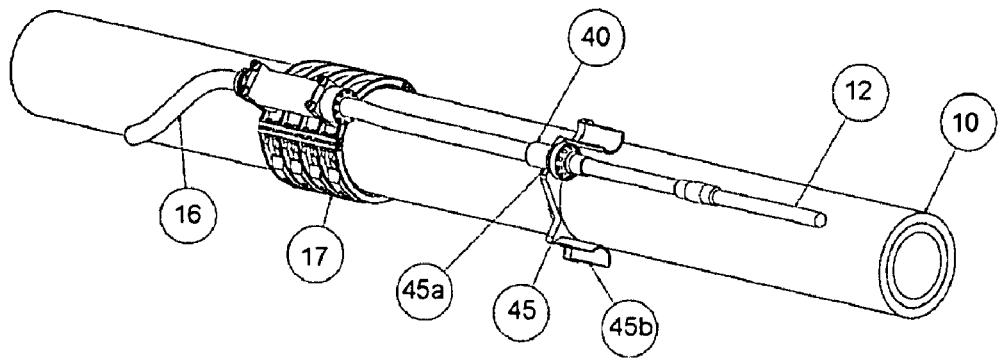
FIG. 3A presents a perspective view of the connection of the feeder cable to the pipeline.

FIG. 3A shows the terminal assembly as an integral part of the overall Direct Electric Heating system. The armored feeder cable 16 is secured to the pipeline 10 by use of the steel amour in the feeder cable 16 and a cable anchor clamp 17.

The terminal assembly is detailed in FIG. 3B presenting how the concentric conductor 5 is terminated to the pipeline 10 by the use of a concentric conductor adapter 40. Because of the narrow space between the cable and the main housing 43, the exchange of water is kept to a minimum, thus limiting corrosion in the contact area of the concentric conductor 5 and of the main housing 43.

Other steps to prevent corrosion is to fill up free spaces with oil or asphalt, to seal the openings between the cable and main housing 43 and the opening between the cable and press plate 42 with seals, gaskets, heat shrink or similar.

Installation of the terminal assembly is performed as follows. The coaxial armored feeder cable 16 is cut a short length from the point where the concentric conductor adapter 40 shall be. The sheath 8 covering the concentric conductor 5 is removed to the place where the concentric conductor adapter 40 shall be mounted. The concentric conductor is cut at almost the same length as the cone 41. The concentric conductor adapter 40 is put on the cable at the exact location.

The concentric conductor 5 is bent out sufficiently so that the cone 41 can slip in between the concentric conductor 5 and the insulation screen 4. The cone is then pressed towards the main housing 43 with press plate 42 so that the concentric conductor 5 is squeezed between the cone and the wall of the main housing 43, thus securing a good electrical connection. The gap between the press plate and cable is sealed as described above.

The invention claimed is:

1. Electric power cable used as a riser and/or feeder cable in a Direct Electric Heating system for oil or condensate pipelines, comprising:
   at least two conductors;
   insulation layers;
   armouring means; and
   an outer protective sheath, wherein an outer concentric conductor of said at least two conductors is connected to a near end of the pipeline, and a central conductor of said at least two conductors is connected via a piggyback cable to a far end of the pipeline, to provide power for the heating of said pipeline, and a first insulation layer of said insulation layers is located between the central and the concentric conductors and a second insulation layer of said insulation layers is located outside the concentric conductor.

2. Electric power cable according to claim 1, wherein the first insulation layer surrounding the central conductor and the second insulation layer surrounding the concentric conductor are dimensioned in accordance with the voltage levels concerned.

3. Electric power cable according to claim 1, wherein the first and the second insulation layers are made of the same insulation material, and the first insulation layer is thicker than the second insulation layer.

4. Electric power cable according to claim 1, wherein the second insulation layer surrounding the concentric conductor is dimensioned to provide sufficient insulation to earth, based on pipeline length, nominal current and fault current.

5. Electric power cable according to claim 1, wherein the second insulation layer surrounding the concentric conductor is dimensioned for voltages typically below 1.8 kV dependent on a number of case specific parameters.

6. Electric power cable according to claim 1, wherein the first insulation layer surrounding the central conductor is dimensioned for high voltage normally above 3.6 kV relative concentric conductor, dependent on a number of case specific parameters.

7. Electric power cable according to claim 1, wherein the central conductor cross-section area is greater than 400 mm$^2$.

8. Electric power cable according to claim 1, wherein the central conductor is round, stranded copper wires.

9. Electric power cable according to claim 1, wherein the outer concentric conductor is at least one layer of planetary stranded flat copper wires.

10. Electric power cable according to claim 9, wherein the width of the flat copper wires is more than twice the height.

11. Electric power cable according claim 1, wherein the armouring means are provided by a number of steel armour layers (7) concentrically located outside the second insulation layer (6).

12. Electric power cable according to claim 1, wherein the armouring means are provided by integral tensile strength wire-elements incorporated in at least one of the central and concentric conductors.

13. Electric power cable according preceding claim 1, wherein additional electric or fibre optic signal cables or steel tubes, are located in between the concentric conductor and the armouring layer.

14. Electric power cable according to claim 1, wherein fibre optic elements for piggyback fault detection is located inside a semi-conducting sheath between the two conductors.

15. Terminal assembly comprising:
a concentric conductor adapter;
a concentric conductor connection point adapted to providing an electric connection of the electric power cable according to claim 1, with a pipeline, wherein the adapter includes at least one cone adapted to squeeze the concentric conductor of the electric power cable against an electrically conductive part of the concentric conductor adapter.

16. Terminal assembly according to claim 15, wherein a press-plate is adapted to press the at least one cone axially inwards to squeeze the outer concentric conductor of the electric power cable.

17. Terminal assembly according to claim 16, wherein the press-plate is made of non-magnetic material.

18. Terminal assembly according to claim 15, wherein the at least one cone is made of non-magnetic material.

19. Terminal assembly according to claim 15, wherein a concentric conductor connection point connects the concentric conductor adapter to the pipeline.

* * * * *